United States Patent
Kang et al.

(10) Patent No.: US 11,841,233 B1
(45) Date of Patent: Dec. 12, 2023

(54) METHOD FOR PROVIDING RECOMMENDED EXERCISE ROUTE INFORMATION, SERVER AND SYSTEM USING THE SAME

(71) Applicant: AJOU UNIVERSITY INDUSTRY-ACADEMIC COOPERATION FOUNDATION, Suwon-si (KR)

(72) Inventors: Juyoung Kang, Suwon-si (KR); Sehyoung Kim, Suwon-si (KR); Jaehyeong Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 18/311,649

(22) Filed: May 3, 2023

(30) Foreign Application Priority Data

Jun. 27, 2022 (KR) .......................... 10-2022-0078307

(51) Int. Cl.
*G01C 21/34* (2006.01)

(52) U.S. Cl.
CPC ..... *G01C 21/3461* (2013.01); *G01C 21/3484* (2013.01)

(58) Field of Classification Search
CPC .......................... G01C 21/3461; G01C 21/3484
See application file for complete search history.

(56) References Cited

U.S. PATENT DOCUMENTS

2010/0145603 A1* 6/2010 Jung .................. G01C 21/3694
701/532
2015/0081210 A1* 3/2015 Yeh ....................... G06F 3/0481
701/428

(Continued)

FOREIGN PATENT DOCUMENTS

| KR | 10-2010-0066087 A | 6/2010 |
|---|---|---|
| KR | 10-2017-0001377 A | 1/2017 |
| KR | 10-2306659 B1 | 9/2021 |

OTHER PUBLICATIONS

Request for the Submission of an Opinion for 10-2022-0078307 dated Sep. 21, 2022.

*Primary Examiner* — Rami Khatib
(74) *Attorney, Agent, or Firm* — Sughrue Mion, PLLC (57) ABSTRACT

Provided are a method of providing recommended exercise route information, the method comprises extracting exercise route candidate areas based on satellite image data collected, generating candidate exercise routes using the extracted exercise route candidate areas, analyzing shape characteristics and environmental characteristics of each of the candidate exercise routes, clustering, the candidate exercise routes based on the shape characteristics and the environmental characteristics of each of the candidate exercise routes, analyzing a condition of each of the candidate exercise routes using the satellite image data, providing recommended exercise route information to a user based on the clustered groups of the candidate exercise routes and the condition of each of the candidate exercise routes, wherein the environmental characteristics of the candidate exercise routes include architectural structures around the candidate exercise routes and natural environment around the candidate exercise routes, and the condition of each of the candidate exercise routes includes a state in which water is (Continued)

stagnant on the route due to rain, a state in which garbage exists on the route, and a state of construction on the route.

10 Claims, 4 Drawing Sheets

(56) References Cited

U.S. PATENT DOCUMENTS

| | | | | |
|---|---|---|---|---|
| 2016/0113565 | A1* | 4/2016 | Lee | A61B 5/02055 |
| | | | | 701/533 |
| 2016/0375306 | A1* | 12/2016 | Gu | G01C 21/3676 |
| | | | | 701/430 |
| 2018/0043212 | A1* | 2/2018 | Shirai | A63B 24/0062 |
| 2019/0293446 | A1* | 9/2019 | Cho | G01C 21/3664 |
| 2019/0366156 | A1* | 12/2019 | Tang | A63B 24/0062 |

\* cited by examiner

METHOD FOR PROVIDING RECOMMENDED EXERCISE ROUTE INFORMATION, SERVER AND SYSTEM USING THE SAME

CROSS-REFERENCE TO RELATED APPLICATIONS

This application claims the benefit of Korean Patent Application No. 10-2022-0078307, filed on Jun. 27, 2022, in the Korean Intellectual Property Office, the disclosure of which is incorporated herein in its entirety by reference.

BACKGROUND

1. Field

The present invention relates to a method, server, and system for providing recommended exercise route information, and more particularly, to a method of generating candidate exercise routes by combining exercise route candidate areas extracted from satellite image data, clustering the candidate exercise routes, and providing the recommended exercise route information to a user based on the clustered candidate exercise routes, and a server and a system using the method.

2. Description of the Related Art

Recently, with the proliferation of wearable devices, numerous applications utilizing wearable devices to provide users with appropriate exercise information have emerged.

In particular, applications that recommend exercise routes suitable for walking, jogging, running, etc. have also been developed. However, these applications often do not reflect the actual characteristics or conditions of exercise routes since they simply recommend exercise routes based on constructed map data.

SUMMARY

Provided are a method of generating candidate exercise routes by combining exercise route candidate areas extracted from satellite image data, clustering the candidate exercise routes, and providing the recommended exercise route information to a user based on the clustered candidate exercise routes, and a server and a system using the method.

According to an aspect of an embodiment, a method of providing recommended exercise route information may comprise extracting, by a recommended exercise route information providing server, exercise route candidate areas based on satellite image data collected, generating, by the recommended exercise route information providing server, candidate exercise routes using the extracted exercise route candidate areas, analyzing, by the recommended exercise route information providing server, shape characteristics and environmental characteristics of each of the candidate exercise routes, clustering, by the recommended exercise route information providing server, the candidate exercise routes based on the shape characteristics and the environmental characteristics of each of the candidate exercise routes, analyzing, by the recommended exercise route information providing server, a condition of each of the candidate exercise routes using the satellite image data, providing, by the recommended exercise route information providing server, recommended exercise route information to a user based on the clustered groups of the candidate exercise routes and the condition of each of the candidate exercise routes, wherein the environmental characteristics of the candidate exercise routes may include architectural structures around the candidate exercise routes and natural environment around the candidate exercise routes, and the condition of each of the candidate exercise routes may include a state in which water is stagnant on the route due to rain, a state in which garbage exists on the route, and a state of construction on the route.

According to an aspect of an embodiment, the extracting the exercise route candidate areas may comprise analyzing, by the recommended exercise route information providing server, the land cover distribution characteristics from the satellite image data and extracting the exercise route candidate areas based on the analyzed land cover distribution characteristics.

According to an aspect of an embodiment, the extracting the exercise route candidate areas may comprise extracting areas with land cover characteristics that can be exercised from above, based on the analyzed land cover distribution characteristics, to form the exercise route candidate areas, by the recommended exercise route information providing server.

According to an aspect of an embodiment, the extracting the exercise route candidate areas may comprise excluding areas corresponding to roadways from the extracted exercise route candidate areas, by the recommended exercise route information providing server.

According to an aspect of an embodiment, the generating candidate exercise routes using the extracted exercise route candidate areas may comprise combining the extracted exercise route candidate areas, based on land cover characteristics within each area, altitude changes, area length, and surrounding environment, and generating the candidate exercise routes based on the combination results, by the recommended exercise route information providing server.

According to an aspect of an embodiment, the generating candidate exercise routes using the extracted exercise route candidate areas may comprise defining characteristics of the generated candidate exercise routes each of which is generated as a combination of the exercise route candidate areas, based on the land cover characteristics within each of the combined exercise route candidate areas, the amount of altitude change, the length of the areas, and the surrounding environment of the areas, by the recommended exercise route information providing server.

According to an aspect of an embodiment, the shape characteristic of the candidate exercise routes may include the degree of curvature of the candidate exercise routes, the amount of altitude change on the candidate exercise routes, and the length of the candidate exercise routes.

According to an aspect of an embodiment, the clustering the candidate exercise routes may perform the clustering using a convolutional neural network (CNN).

According to an aspect of an embodiment, the providing the recommended exercise route information to the user may comprise comparing the shape characteristics and environment characteristics of the clustered groups of the exercise route candidate areas with shape characteristics and environment characteristics of the user's past exercise routes, and providing the recommended exercise route information to the user based on the comparison result, by the recommended exercise route information providing server.

According to an aspect of an embodiment, the providing recommended exercise route information to the user may comprise providing the recommended exercise route information to the user based on the groups of exercise route candidate areas clustered and an exercise mode selected by the user, and the condition of each of the candidate exercise routes, by the recommended exercise route information providing server.

According to an aspect of an embodiment, the exercise mode may include walking mode, jogging mode, running mode, and special exercise mode.

According to an aspect of an embodiment, a recommended exercise route information providing system may comprise a exercise route candidate area extraction module configured to extract exercise route candidate areas based on collected satellite image data, a candidate exercise route generation module configured to generate candidate exercise routes using the extracted exercise route candidate areas, a route characteristic analysis module configured to analyze shape characteristics and environmental characteristics of each of the generated candidate exercise routes and the condition of each of the candidate exercise routes using the satellite image data, a clustering module configured to cluster the candidate exercise routes, based on the shape characteristics and environmental characteristics of the candidate exercise routes and a recommended information providing module configured to provide recommended exercise route information to a user, based on the clustered groups of the candidate exercise routes and the condition of each of the candidate exercise routes, wherein the environmental characteristics of the candidate exercise routes include architectural structures around the candidate exercise routes and natural environment around the candidate exercise routes, and the condition of the candidate exercise routes includes a state in which water is stagnant on the route due to rain, a state in which garbage exists on the route, and a state of construction on the route.

According to an aspect of an embodiment, a recommended exercise route information providing system may comprise a user terminal and a recommended exercise route information providing server that provides recommended exercise route information to the user terminal, in response to a recommendation request inputted by a user through the user terminal, wherein the recommended exercise route information providing server may comprise a exercise route candidate area extraction module configured to extract exercise route candidate areas based on collected satellite image data, a candidate exercise route generation module configured to generate candidate exercise routes using the extracted exercise route candidate areas, a route characteristic analysis module configured to analyze shape characteristics and environmental characteristics of each of the generated candidate exercise routes and the condition of each of the candidate exercise routes using the satellite image data, a clustering module configured to cluster the candidate exercise routes, based on the shape characteristics and environmental characteristics of the candidate exercise routes and a recommended information providing module configured to provide the recommended exercise route information to the user, based on the clustered groups of the candidate exercise routes and the condition of each of the candidate exercise routes, wherein the environmental characteristics of the candidate exercise routes include architectural structures around the candidate exercise routes and natural environment around the candidate exercise routes, and the condition of the candidate exercise routes includes a state in which water is stagnant on the route due to rain, a state in which garbage exists on the route, and a state of construction on the route.

The method and device according to the embodiments of the present invention generate candidate exercise routes by combining exercise route candidate areas extracted from satellite image data, cluster the candidate exercise routes, and provide recommended exercise route information to the user based on the clustered candidate exercise routes, thereby enabling the recommendation of optimal exercise routes that reflect the actual state and environment of the exercise route.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, each processes may be performed by hardware such as a processor, a microprocessor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software in a system. Furthermore, the system may include a memory that stores program or data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the disclosure will be described in detail.

Figure 1:
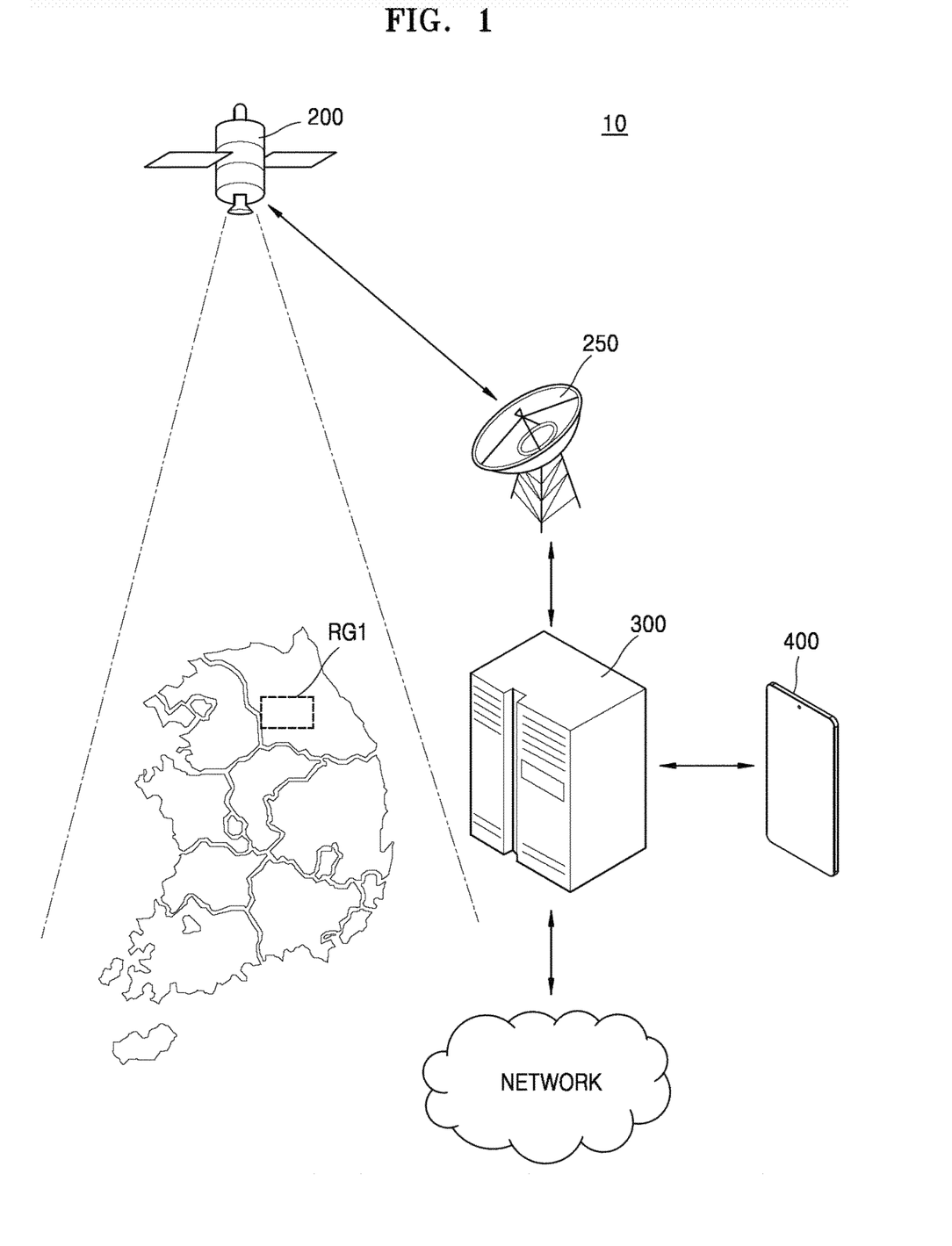
FIG. 1 is a conceptual diagram of a recommended exercise route information providing system according to an embodiment of the present invention.

FIG. 1 is a conceptual diagram of a recommended exercise route information providing system according to an embodiment of the present invention.

Referring to FIG. 1, the recommended exercise route information providing system 10 according to an embodiment of the present invention extracts exercise route candidate areas from satellite image data of a first area RG1 corresponding to the area where the candidate exercise routes are to be created, generates candidate exercise routes by combining the extracted exercise route candidate areas, clusters the generated candidate exercise routes, and provides recommended exercise route information.

The recommended exercise route information providing system 10 may include a satellite 200, a ground station 250, a recommended exercise route information providing server 300, and a user terminal 400.

In one embodiment, the first area RG1 may be an area corresponding to the input entered by the user via the user terminal 400.

In another embodiment, the first area RG1 may be an area selected by the recommended exercise route information providing server 300.

The satellite 200 may obtain a satellite image about the first area RG1 by using a satellite camera mounted on the satellite 200 and may transmit satellite image data about the obtained satellite image to the ground station 250.

According to an embodiment, the satellite 200 may transmit satellite image data including a hyperspectral image to the ground station 250 by using a hyperspectral camera mounted on the satellite 200.

The ground station 250 is located on the ground and may include a satellite antenna to receive various data transmitted from the satellite 200. The ground station 250 may receive the satellite image data transmitted from the satellite 200, and transmit the received satellite image data to the recommended exercise route information providing server 300.

According to an embodiment, the recommended exercise route information providing system 10 may be implemented in a form that does not include the ground station 250.

According to another embodiment, the recommended exercise route information providing system 10 may include a separate server (not shown) for managing satellite image data, and in this case, the recommended exercise route information providing server 300 may receive satellite image data from the separate server (not shown).

The recommended exercise route information providing server 300 may receive satellite image data transmitted from a ground station 250, generate recommended exercise route information based on the received satellite image data, and provide the recommended exercise route information to a user terminal 400.

In the embodiment, the recommended exercise route information providing server 300 may extract a first region RG1 corresponding to information input by a user through the user terminal 400, such as the user's residential address and the desired exercise area, and generate recommended exercise route information based on candidate exercise routes generated within the first region RG1.

In this case, the recommended exercise route information providing server 300 may collect land data corresponding to the input information through a wired or wireless network to extract the first region RG1 corresponding to the input information. The recommended exercise route information providing server 300 may extract the first region RG1 from the satellite image data using the input information input by a user and the collected land data.

The recommended exercise route information providing server 300 may generate recommended exercise route information based on candidate exercise routes generated within the first area RG1 and provide it to the user terminal 400.

The detailed structure and operation of the recommended exercise route information providing server 300 will be described later with reference to FIGS. 2 to 4.

A user can receive the recommended exercise route information through the user terminal 400.

In one embodiment, the user terminal 400 may be implemented as a communication-capable device. Although the example of a smartphone is illustrated in FIG. 1 as an example of the user terminal 400, the user terminal 400 may be implemented in various forms of devices (such as PCs) capable of wired or wireless communication.

Figure 2:
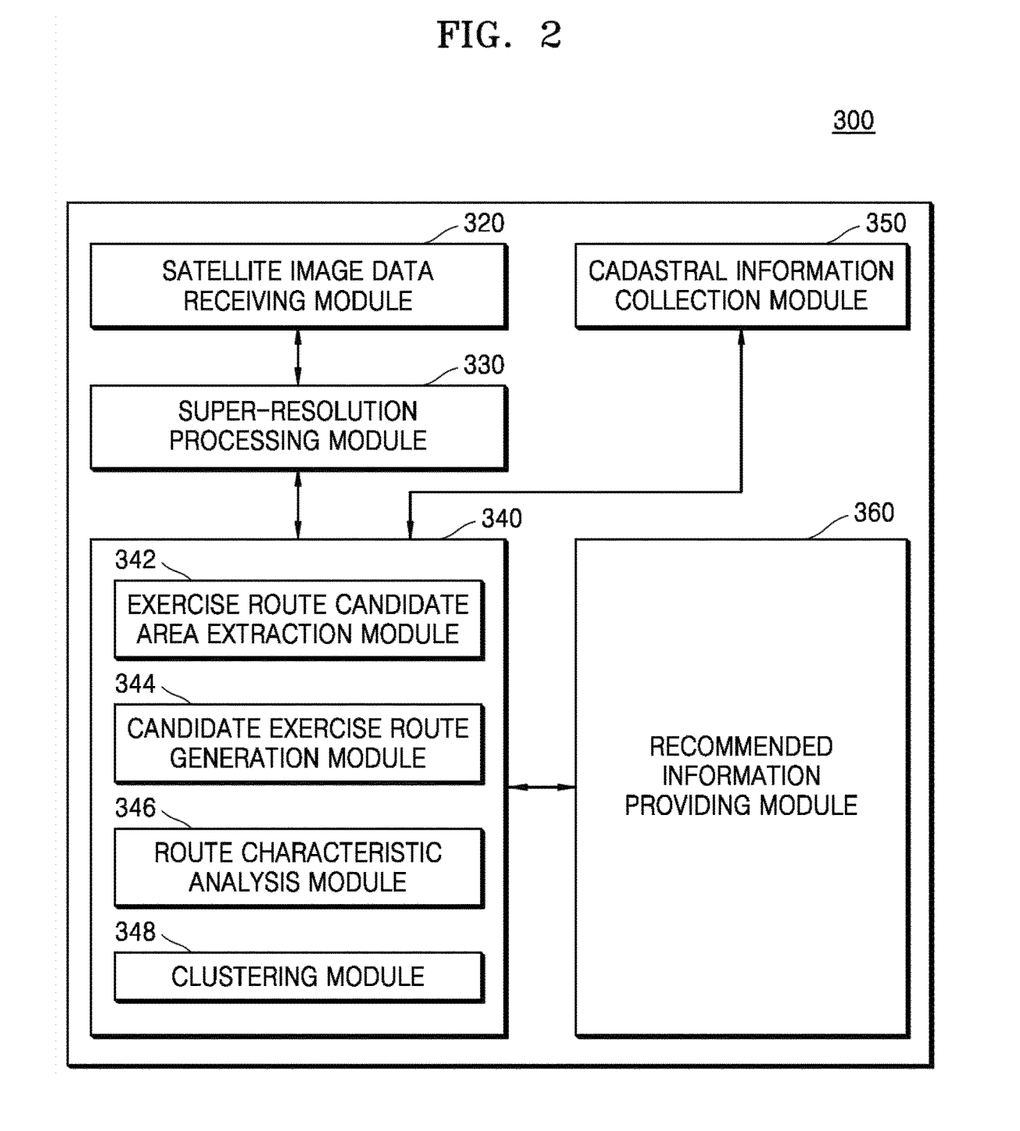
FIG. 2 is a block diagram of a recommended exercise route information providing server according to an embodiment of the present invention, shown in FIG. 1.

FIG. 2 is a block diagram of a recommended exercise route information providing server according to an embodiment of the present invention, shown in FIG. 1. FIG. 3 is a view illustrating an example of a process of generating candidate exercise routes in the recommended exercise route information providing server shown in FIG. 2, by combining and clustering exercise route candidate areas extracted from satellite image data.

Referring to FIGS. 1 and 2, the recommended exercise route information providing server 300 may include a satellite image data receiving module 320, a super-resolution processing module 330, a data extraction and analysis module 340, a cadastral information collection module 350, and a recommended information providing module 360.

The satellite image data receiving module 320 may receive the satellite image data transmitted from the satellite 200, and transmit the received satellite image data to the super-resolution processing module 330.

According to an embodiment, the satellite image data receiving module 320 may process (e.g., resizing data, changing format) the received satellite image data into a form suitable for use in the recommended exercise route information providing server 300.

The super-resolution processing module 330 may perform super-resolution processing of the satellite image data received from the satellite image data receiving module 320 and generate super-resolution processed satellite image data.

According to an embodiment, the super-resolution processing module 330 may improve a resolution of the satellite image data by using various processing techniques (e.g., high frequency component reconstruction, pre-processing filtering, super-resolution filtering, post-processing filtering, etc.).

According to an embodiment, in the recommended exercise route information providing server 300, the configuration of the super-resolution processing module 330 may be omitted.

The data extraction and analysis module 340 may include an exercise route candidate area extraction module 342, a candidate exercise route generation module 344, a route characteristic analysis module 346, and a clustering module 348.

The exercise route candidate area extraction module 342 may extract exercise route candidate areas from the received satellite image data.

According to an embodiment, the exercise route candidate area extraction module 342 may analyze the distribution characteristics of land cover from satellite image data, and extract exercise route candidate areas based on analyzed the distribution characteristics of land cover. For example, the exercise route candidate area extraction module 342 may extract areas that have land cover characteristics that can be exercised from above, based on the analyzed the distribution characteristics of land cover (e.g., asphalt, sidewalk blocks, polyurethane, dirt road, etc.) as exercise route candidate areas.

According to an embodiment, the exercise route candidate area extraction module 342 may exclude areas corresponding to roadways from the extracted exercise route candidate areas. For example, the areas corresponding to roadways may have land cover characteristics that can be exercised from above, but may be unsuitable for exercising. In this case, the exercise route candidate area extraction module 342 may receive information on the areas corresponding to roadways from the cadastral information collection module 350 and exclude them from the exercise route candidate areas.

The candidate exercise route generation module 344 may generate candidate exercise routes using the extracted exercise route candidate areas by the exercise route candidate area extraction module 342.

According to an embodiment, the candidate exercise route generation module 344 may combine the exercise route candidate areas extracted by the exercise route candidate area extraction module 342 based on the land cover characteristics, altitude changes, length of the area, and surrounding environment of the area, and generate candidate exercise routes according to the combination result.

Figure 3:
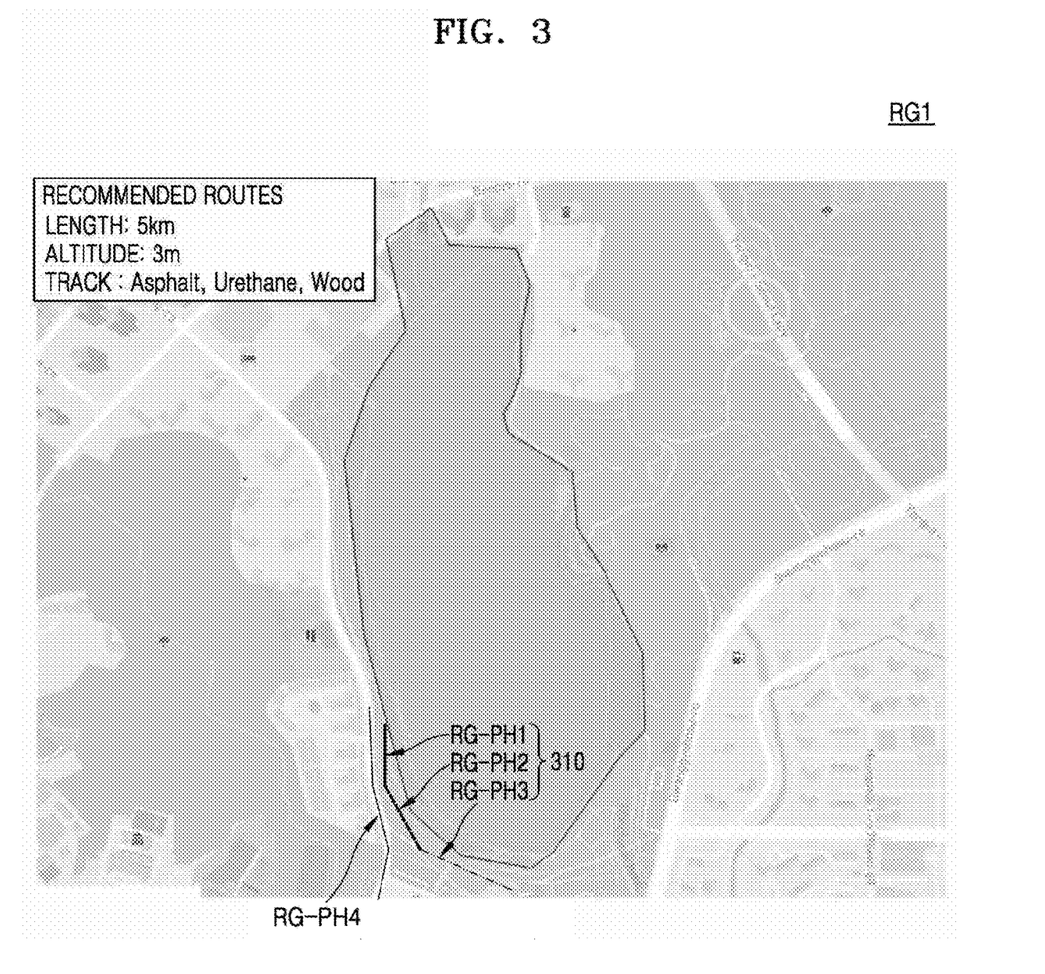
FIG. 3 is a view illustrating an example of a process of generating candidate exercise routes in the recommended exercise route information providing server shown in FIG. 2, by combining and clustering exercise route candidate areas extracted from satellite image data.

Referring also to FIG. 3, which represents the first region RG1 in satellite image data, presented herein as a simplified map image for convenience.

The exercise route candidate area extraction module 342 may extract exercise route candidate areas RG-PH1~RG-PH4 corresponding to land cover characteristics (e.g., asphalt, pavement blocks, polyurethane, soil, etc.) that can be exercised from above, based on the analyzed characteristics of land cover. In this case, the fourth exercise route candidate area RG-PH4 corresponds to the roadway area, and the exercise route candidate area extraction module 342 may exclude the fourth exercise route candidate area RG-PH4 from the exercise route candidate areas.

The candidate exercise route generation module 344 may combine the exercise route candidate areas RG-PH1 to RG-PH3 based on land cover characteristics, altitude variation, area length, and surrounding environment within the area, and generate a candidate exercise route C-PH according to the combination result. For example, land cover characteristics within the area may represent the material of the land cover for each exercise route candidate area RG-PH1 to RG-PH3, such as asphalt, sidewalk blocks, urethane, dirt, etc. Altitude variation may represent a quantified value of the degree of altitude variation on each path for each exercise route candidate area RG-PH1 to RG-PH3. Area length may represent the length of each exercise route candidate area RG-PH1 to RG-PH3. Surrounding environment may represent the types of architectural structures, parks, natural environments, etc., located around each exercise route candidate area RG-PH1 to RG-PH3.

Returning to FIG. 2, the route characteristic analysis module 346 may define the shape characteristics and environment characteristics of the candidate exercise route generated by the combination of exercise route candidate areas based on land cover characteristics, altitude variation, area length, and surrounding environment within each exercise route candidate area.

According to an embodiment, the route characteristic analysis module 346 may further analyze the state of each candidate exercise route from satellite image data. For example, the state of candidate exercise routes may include various states such as a state in which water is stagnant on the route due to rain, a state in which garbage exists on the route, and a state of construction on the route.

Referring together with FIG. 3, the route characteristic analysis module 346 may define the shape characteristics and environmental characteristics of the candidate exercise route C-PH composed of combinations of exercise route candidate areas RG-PH1 to RG-PH3 based on the land cover characteristics, altitude variation, length, and surrounding environment of each exercise route candidate area RG-PH1 to RG-PH3.

According to an embodiment, the shape characteristics of the candidate exercise route may include the degree of curvature of the candidate exercise routes, the amount of altitude change on the candidate exercise routes, and the length of the candidate exercise routes.

According to an embodiment, the environmental characteristics of the candidate exercise route may include the land cover material of the candidate exercise route, architectural structures surrounding the candidate exercise route, and natural environment surrounding the candidate exercise route.

For example, the route characteristic analysis module 346 may define that the candidate exercise route C-PH composed of combinations of exercise route candidate areas RG-PH1 to RG-PH3 has a shape characteristic of being a route with significant altitude changes if the altitude changes of the exercise route candidate areas RG-PH1 to RG-PH3 are greater than a predetermined value.

For example, the route characteristic analysis module 346 may define that the candidate exercise route C-PH composed of combinations of exercise route candidate areas RG-PH1 to RG-PH3 has an environment characteristic of being a route with dirt if the proportion of land cover characteristics consisting of dirt in the exercise route candidate areas RG-PH1 to RG-PH3 is greater than a predetermined value.

Returning to FIG. 2, the clustering module 348 may cluster candidate exercise routes based on the shape characteristics and environment characteristics of each candidate exercise route defined by the route characteristic analysis module 346.

According to an embodiment, the clustering module 348 may cluster candidate exercise routes with similar shape characteristics and path environment characteristics into one group.

According to an embodiment, the clustering module 348 may vectorize each of the shape characteristics and environment characteristics, and cluster candidate exercise routes using the vectorized shape characteristics and environment characteristics.

According to an embodiment, the clustering module 348 may perform clustering using a Convolutional Neural Network (CNN). According to an embodiment, vectorized shape characteristics and environment characteristics may be used as input values of the convolutional neural network. According to an embodiment, after reducing the dimension of vectorized shape characteristics and environment characteristics into one low-dimensional vector, the clustering module 348 may cluster candidate exercise routes using the reduced vectors. According to an embodiment, the clustering module 348 may cluster candidate exercise routes as one group if the distance between the reduced vectors is below a predetermined threshold value, such as the Euclidean distance.

The recommended information providing module 360 may provide recommended exercise route information to the user based on the groups clustered by the clustering module 348.

According to an embodiment, the recommended information providing module 360 may provide recommended exercise route information to the user based on the state of each candidate exercise route analyzed by the route characteristic analysis module 346 and the groups clustered by the clustering module 348. In this case, the recommended exercise route information may be provided by recommending candidate exercise routes of the group corresponding to the user's input or the user's exercise history, excluding candidate exercise routes that are unsuitable for exercise based on their state.

According to an embodiment, the recommended information providing module 360 may provide recommended exercise route information to a user based on clustered groups by clustering module 348, exercise mode selected by the user, and candidate exercise routes.

For example, exercise modes may include walking, jogging, and special exercise modes (such as plogging). For special exercise mode, candidate exercise routes that meet the requirements of the special exercise mode may be recommended. For example, for plogging mode, candidate exercise routes with trash on the route may be recommended.

Figure 4:
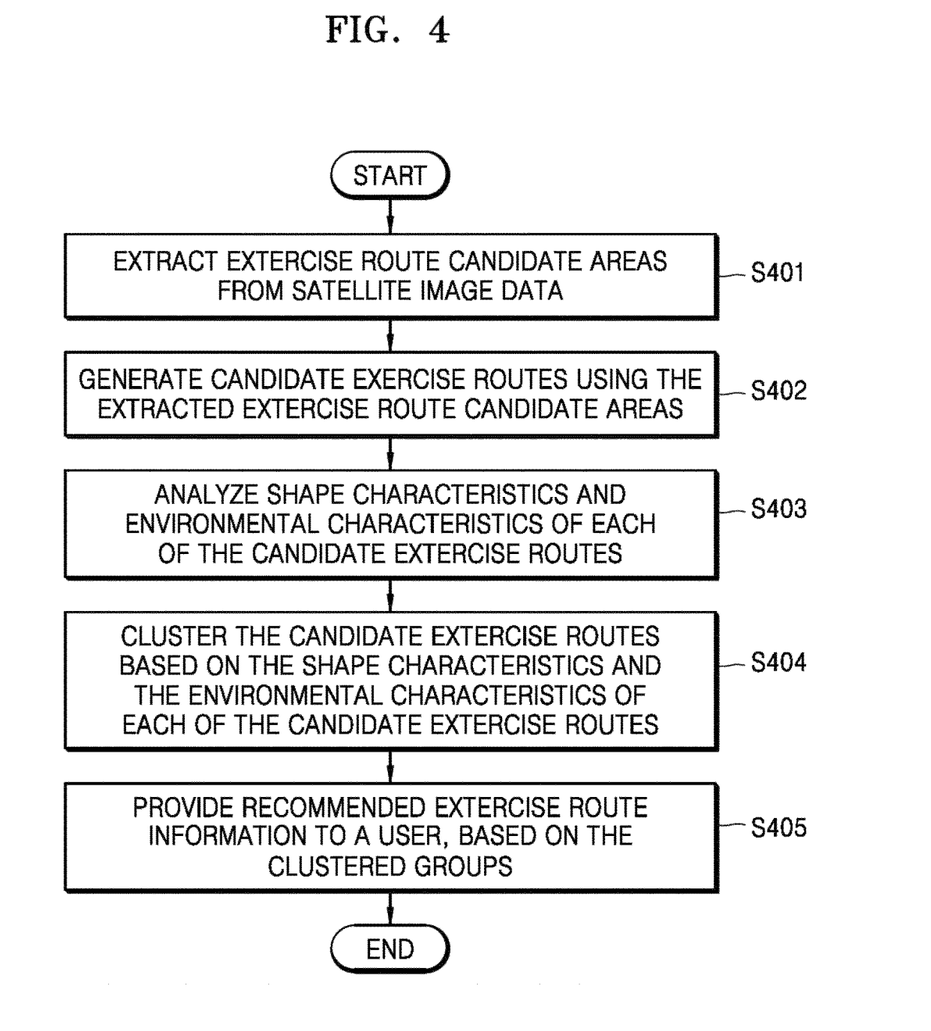
FIG. 4 is a flowchart of a method of providing recommended exercise route information according to an embodiment of the present invention.

FIG. 4 is a flowchart of a method of providing recommended exercise route information according to an embodiment of the present invention.

Referring to FIGS. 1 to 4, the recommended exercise route information providing server 300 may extract exercise route candidate areas from satellite image data (S401).

According to an embodiment, the recommended exercise route information providing server 300 may analyze the distribution characteristics of land cover based on satellite image data, and may extract exercise route candidate areas corresponding to land cover characteristics that can be exercised from above.

The recommended exercise route information providing server 300 may generate candidate exercise routes using the exercise route candidate areas extracted in step S401 (S402).

According to an embodiment, a recommended exercise route information providing server 300 may generate candidate exercise routes by combining exercise route candidate areas extracted based on land cover characteristics, altitude variation, length of the area, and surrounding environment of each area.

The recommended exercise route information providing server 300 may analyze the shape characteristics and environmental characteristics of each generated candidate exercise route in step S403.

According to an embodiment, the recommended exercise route information providing server 300 may define the shape characteristics and environmental characteristics of the candidate exercise routes generated by combining the exercise route candidate areas based on land cover characteristics, altitude variation, length of the area, and surrounding environment of each area.

The recommended exercise route information providing server 300 may cluster the candidate exercise routes based on the shape characteristics and environmental characteristics of each candidate exercise route defined in step S403 in step S404.

According to an embodiment, the recommended exercise route information providing server 300 may perform clustering using a convolutional neural network.

The recommended exercise route information providing server 300 may provide recommended exercise route information to a user based on the clustered groups generated in step S404 (S405).

According to an embodiment, the recommended exercise route information providing server 300 may provide recommended exercise route information to a user based on the clustered groups and the status of each candidate exercise route generated in step S404.

In another embodiment, the recommended exercise route information providing server 300 may provide the user with recommended exercise route information based on the clustered groups at S404, the exercise mode selected by the user, and the status of each candidate exercise route.

According to an embodiment of the present invention, the method for providing recommended exercise route information as described in this embodiment can be implemented as a program code and stored in a medium. The medium can be combined with a processor to execute the method for providing recommended exercise route information.

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

What is claimed is:

1. A method of providing recommended exercise route information, the method comprising:
   extracting, by a recommended exercise route information providing server, exercise route candidate areas based on satellite image data collected;
   generating, by the recommended exercise route information providing server, candidate exercise routes using the extracted exercise route candidate areas;
   analyzing, by the recommended exercise route information providing server, shape characteristics and environmental characteristics of each of the candidate exercise routes;
   clustering, by the recommended exercise route information providing server, the candidate exercise routes based on the shape characteristics and the environmental characteristics of each of the candidate exercise routes;
   analyzing, by the recommended exercise route information providing server, a condition of each of the candidate exercise routes using the satellite image data;
   providing, by the recommended exercise route information providing server, recommended exercise route information to a user based on the clustered groups of the candidate exercise routes, an exercise mode selected by the user and the condition of each of the candidate exercise routes,
   wherein the environmental characteristics of the candidate exercise routes include architectural structures around the candidate exercise routes and natural environment around the candidate exercise routes, wherein the condition of each of the candidate exercise routes includes a state in which water is stagnant on the route, and a state of construction on the route, wherein the providing of the recommended exercise route information comprises providing the recommended exercise route information by recommending a group of the candidate exercise routes corresponding to an input of the user or an exercise history of the user among the clustered groups of the candidate exercise routes and excluding, among the candidate exercise routes, exercise routes that are unsuitable for exercise based on states of the candidate exercise routes, wherein the exercise mode includes a walking mode, a jogging mode or a running mode, wherein the clustering of the candidate exercise routes performs the clustering using a convolutional neural network (CNN), and wherein the clustering of the candidate exercise routes comprises vectorizing each of the shape characteristics and the environment characteristics and clustering the candidate exercise routes by using the vectorized shape characteristics and environment characteristics as input values of the CNN.

2. The method of claim 1, wherein the extracting the exercise route candidate areas comprises:

analyzing, by the recommended exercise route information providing server, a land cover distribution from the satellite image data and extracting, by the recommended exercise route information providing server, the exercise route candidate areas based on the analyzed land cover distribution.

3. The method of claim 2, wherein the extracting the exercise route candidate areas comprises:

extracting areas with land cover characteristics suitable for exercise, based on the analyzed land cover distribution, to form the exercise route candidate areas, by the recommended exercise route information providing server.

4. The method of claim 3, wherein the extracting the exercise route candidate areas comprises:

excluding areas corresponding to roadways from the extracted exercise route candidate areas, by the recommended exercise route information providing server.

5. The method of claim 4, wherein the generating the candidate exercise routes using the extracted exercise route candidate areas comprises:

combining the extracted exercise route candidate areas, based on the land cover characteristics within each area, altitude changes, area length, and surrounding environment, and generating the candidate exercise routes based on the combination results, by the recommended exercise route information providing server.

6. The method of claim 5, wherein the generating the candidate exercise routes using the extracted exercise route candidate areas comprises:

defining characteristics of the generated candidate exercise routes each of which is generated as a combination of the exercise route candidate areas, based on the land cover characteristics within each of the combined exercise route candidate areas, the amount of altitude change, the length of the areas, and the surrounding environment of the areas, by the recommended exercise route information providing server.

7. The method of claim 6, wherein the shape characteristic of the candidate exercise routes includes:

the degree of curvature of the candidate exercise routes, the amount of altitude change on the candidate exercise routes, and the length of the candidate exercise routes.

8. The method of claim 1, wherein the providing the recommended exercise route information to the user comprises:

comparing the shape characteristics and environment characteristics of the clustered groups of the candidate exercise routes with shape characteristics and environment characteristics of the user's past exercise routes, and providing the recommended exercise route information to the user based on the comparison result, by the recommended exercise route information providing server.

9. A recommended exercise route information providing system comprising at least one processor and a memory under control of the at least one processor, and the memory including a computer program which enables the at least one processor to perform operations comprising:

extracting exercise route candidate areas based on collected satellite image data;

generating candidate exercise routes using the extracted exercise route candidate areas;

analyzing shape characteristics and environmental characteristics of each of the generated candidate exercise routes and the condition of each of the candidate exercise routes using the satellite image data;

clustering the candidate exercise routes, based on the shape characteristics and environmental characteristics of the candidate exercise routes; and providing recommended exercise route information to a user, based on the clustered groups of the candidate exercise routes, an exercise mode selected by the user and the condition of each of the candidate exercise routes, wherein the environmental characteristics of the candidate exercise routes include architectural structures around the candidate exercise routes and natural environment around the candidate exercise routes, wherein the condition of the candidate exercise routes includes a state in which water is stagnant on the route, and a state of construction on the route, wherein the providing of the recommended exercise route information comprises providing the recommended exercise route information by recommending a group of the candidate exercise routes corresponding to an input of the user or an exercise history of the user among the clustered groups of the candidate exercise routes and excluding, among the candidate exercise routes, exercise routes that are unsuitable for exercise based on states of the candidate exercise routes, wherein the exercise mode includes a walking mode, a jogging mode or a running mode, wherein the clustering of the candidate exercise routes performs the clustering using a convolutional neural network (CNN), and wherein the clustering of the candidate exercise routes comprises vectorizing each of the shape characteristics and the environment characteristics and clustering the candidate exercise routes by using the vectorized shape characteristics and environment characteristics as input values of the CNN.

10. A recommended exercise route information providing system comprising:

a user terminal; and a recommended exercise route information providing server that provides recommended exercise route information to the user terminal, in response to a recommendation request inputted by a user through the user terminal,
wherein the recommended exercise route information providing server comprises at least one processor and a memory under control of the at least one processor, and the memory including a computer program which enables the at least one processor to perform operations comprising:
extracting exercise route candidate areas based on collected satellite image data;
generating candidate exercise routes using the extracted exercise route candidate areas;
analyzing shape characteristics and environmental characteristics of each of the generated candidate exercise routes and the condition of each of the candidate exercise routes using the satellite image data;
clustering the candidate exercise routes, based on the shape characteristics and environmental characteristics of the candidate exercise routes; and
providing the recommended exercise route information to the user, based on the clustered groups of the candidate exercise routes, an exercise mode selected by the user and the condition of each of the candidate exercise routes,
wherein the environmental characteristics of the candidate exercise routes include architectural structures around the candidate exercise routes and natural environment around the candidate exercise routes,
wherein the condition of the candidate exercise routes includes a state in which water is stagnant on the route, and a state of construction on the route,
wherein the providing of the recommended exercise route information comprises providing the recommended exercise route information by recommending a group of the candidate exercise routes corresponding to an input of the user or an exercise history of the user among the clustered groups of the candidate exercise routes and excluding, among the candidate exercise routes, exercise routes that are unsuitable for exercise based on states of the candidate exercise routes,
wherein the exercise mode includes a walking mode, a jogging mode or a running mode,
wherein the clustering of the candidate exercise routes performs the clustering using a convolutional neural network (CNN), and
wherein the clustering of the candidate exercise routes comprises vectorizing each of the shape characteristics and the environment characteristics and clustering the candidate exercise routes by using the vectorized shape characteristics and environment characteristics as input values of the CNN.

* * * * *